(12) United States Patent
Takaiwa et al.

(10) Patent No.: US 7,646,416 B2
(45) Date of Patent: Jan. 12, 2010

(54) IMAGE PICKUP APPARATUS WITH STORAGE OF ORIGINAL IMAGE, FIRST REDUCED IMAGE, SECOND REDUCED IMAGE AND THUMBNAIL DATA

(75) Inventors: Kan Takaiwa, Tokyo (JP); Yuji Yamamoto, Saitama (JP); Emi Hitosuga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1068 days.

(21) Appl. No.: 10/666,117

(22) Filed: Sep. 19, 2003

(65) Prior Publication Data

US 2004/0056973 A1 Mar. 25, 2004

(30) Foreign Application Priority Data

Sep. 20, 2002 (JP) ............................. 2002-276282
Sep. 20, 2002 (JP) ............................. 2002-276286
Sep. 20, 2002 (JP) ............................. 2002-276287

(51) Int. Cl.
*H04N 5/222* (2006.01)
*H04N 5/76* (2006.01)

(52) U.S. Cl. ............................ 348/333.05; 348/333.01; 348/231.99

(58) Field of Classification Search ............ 348/231.99, 348/231.2, 231.3, 333.01, 333.05, 333.11, 348/333.12
See application file for complete search history.

(56) References Cited

U.S. PATENT DOCUMENTS

| 6,515,704 | B1 * | 2/2003 | Sato .................... 348/333.11 |
| 6,647,125 | B2 | 11/2003 | Matsumoto |
| 6,674,472 | B1 * | 1/2004 | Tsutsui ................. 348/333.05 |
| 6,734,909 | B1 * | 5/2004 | Terane et al. ........... 348/333.05 |
| 6,781,629 | B2 * | 8/2004 | Ohnogi ................. 348/333.01 |
| 6,914,625 | B1 * | 7/2005 | Anderson et al. ........ 348/222.1 |
| 6,944,345 | B2 | 9/2005 | Hayashi et al. |
| 7,227,576 | B2 | 6/2007 | Umeyama |
| 2002/0024608 | A1 * | 2/2002 | Ejima et al. ............ 348/333.05 |
| 2003/0103156 | A1 * | 6/2003 | Brake et al. ............ 348/333.01 |
| 2003/0123696 | A1 * | 7/2003 | Matsumoto et al. ......... 382/100 |

FOREIGN PATENT DOCUMENTS

CN 1430139 A 7/2003

(Continued)

OTHER PUBLICATIONS

English Translation Abstract of Japanese Patent Publication JP 2002-152682 A.

(Continued)

*Primary Examiner*—Kelly L Jerabek
(74) *Attorney, Agent, or Firm*—Cowan, Liebowitz & Latman, P.C.

(57) ABSTRACT

An image pickup apparatus enters an enlargement display mode (in which enlargement display processing of enlarging and displaying part of reduced image data for normal display is performed) from any other image display mode. The image pickup apparatus also performs enlargement display processing of enlarging and displaying part of reduced image data for normal display at a high speed. Furthermore, the image pickup apparatus starts enlargement display processing of enlarging and displaying part of reduced image data for normal display from the portion stored in the previous enlargement display processing.

5 Claims, 8 Drawing Sheets

FOREIGN PATENT DOCUMENTS

| | | |
|---|---|---|
| JP | 06-022200 A | 1/1994 |
| JP | 11-041384 A | 2/1999 |
| JP | 11-308490 A | 11/1999 |
| JP | 2000-92387 A | 3/2000 |
| JP | 2002-077673 A | 3/2002 |
| JP | 2002-152582 A | 5/2008 |

OTHER PUBLICATIONS

English Translation Abstract of Japanese Patent Publication JP 2002-077673 A, Mar. 15, 2002.

English Translation Abstract of Japanese Patent Publication JP 11-041384 A, Feb. 12, 1999.

English Translation Abstract of Japanese Patent Publication JP 11-308490 A, Nov. 5, 1999.

English Translation Abstract of Japanese Patent Publication JP 06-022200 A, Jan. 28, 1994.

* cited by examiner

IMAGE PICKUP APPARATUS WITH STORAGE OF ORIGINAL IMAGE, FIRST REDUCED IMAGE, SECOND REDUCED IMAGE AND THUMBNAIL DATA

BACKGROUND OF THE INVENTION

1. Field of the Invention

The present invention relates to an image pickup apparatus capable of enlarging and displaying part of reduced image data for normal display (obtained by reducing original image data to display it).

2. Related Background Art

Some conventional digital cameras can enlarge and display part of reduced image data for normal display (obtained by reducing original image data to display it), and have a plurality of image display modes (a single image display mode, a four-image display mode, a nine-image display mode, an information display mode, etc.).

However, no conventional digital cameras can enter an enlargement display mode (a mode in which enlargement display processing can be performed to enlarge and display part of reduced image data for normal display) from any other image display mode.

Furthermore, when part of reduced image data for normal display is specified and an enlarged image of the specified part is to be generated from the original image data, it is necessary to decode the original image data, generate reduced image data for enlargement display, and perform a process of segmenting a display area, thereby causing the problem that a specified portion cannot be enlarged and displayed at a high speed.

Additionally, no conventional digital cameras can start the enlargement display processing of enlarging and displaying part of reduced image data for normal display from the portion stored in the previous enlargement display processing.

SUMMARY OF THE INVENTION

An object of the present invention is to overcome the above-described drawbacks.

The present invention also aims at providing an image pickup apparatus (a digital camera, etc.) capable of entering an enlargement display mode (a mode in which enlargement display processing of enlarging and displaying part of reduced image data for normal display is performed) from any other image display mode.

The present invention further aims at providing an image pickup apparatus (a digital camera, etc.) capable of performing at a high speed enlargement display processing of enlarging and displaying part of reduced image data for normal display.

The present invention furthermore aims at providing an image pickup apparatus (a digital camera, etc.) capable of starting enlargement display processing of enlarging and displaying part of reduced image data for normal display from the portion stored in the previous enlargement display processing.

An image pickup apparatuses according to a preferred embodiment of the present invention has a plurality of image display modes and control means for effecting control so that comprises switchover to an enlargement display mode in which an enlargement display processing of enlarging and displaying part of reduced image data, from any other mode of the plurality of image display modes can be performed.

An image pickup apparatuses according to an another preferred embodiment of the present invention comprising: image pickup means for generating image data; image processing means for generating from the image data first reduced image data, second reduced image data larger in size than the first reduced image data, and third reduced image data larger in size than the second reduced image data; image file generation means for generating an image file including the image data, the first reduced image data, the second reduced image data, and the third reduced image data, and writing the generated image file into a storage medium; and display means for displaying the second reduced image data, wherein the image pickup apparatus uses the third reduced image data in an enlargement display processing of enlarging and displaying part of the second reduced image data.

An image pickup apparatuses according to a still another embodiment of the present invention comprises control means for controlling an enlargement display processing of displaying an enlarged image of part of reduced image data, wherein the control means effects control so that the enlargement display processing can be started from the portion set in the previous enlargement display processing.

Still other objects, features and advantages of the present invention will become fully apparent from the following detailed description of the preferred embodiments.

DESCRIPTION OF THE PREFERRED EMBODIMENTS

First Embodiment

The first embodiment of the present invention is described below by referring to FIGS. 1 to 9.

Figure 1:
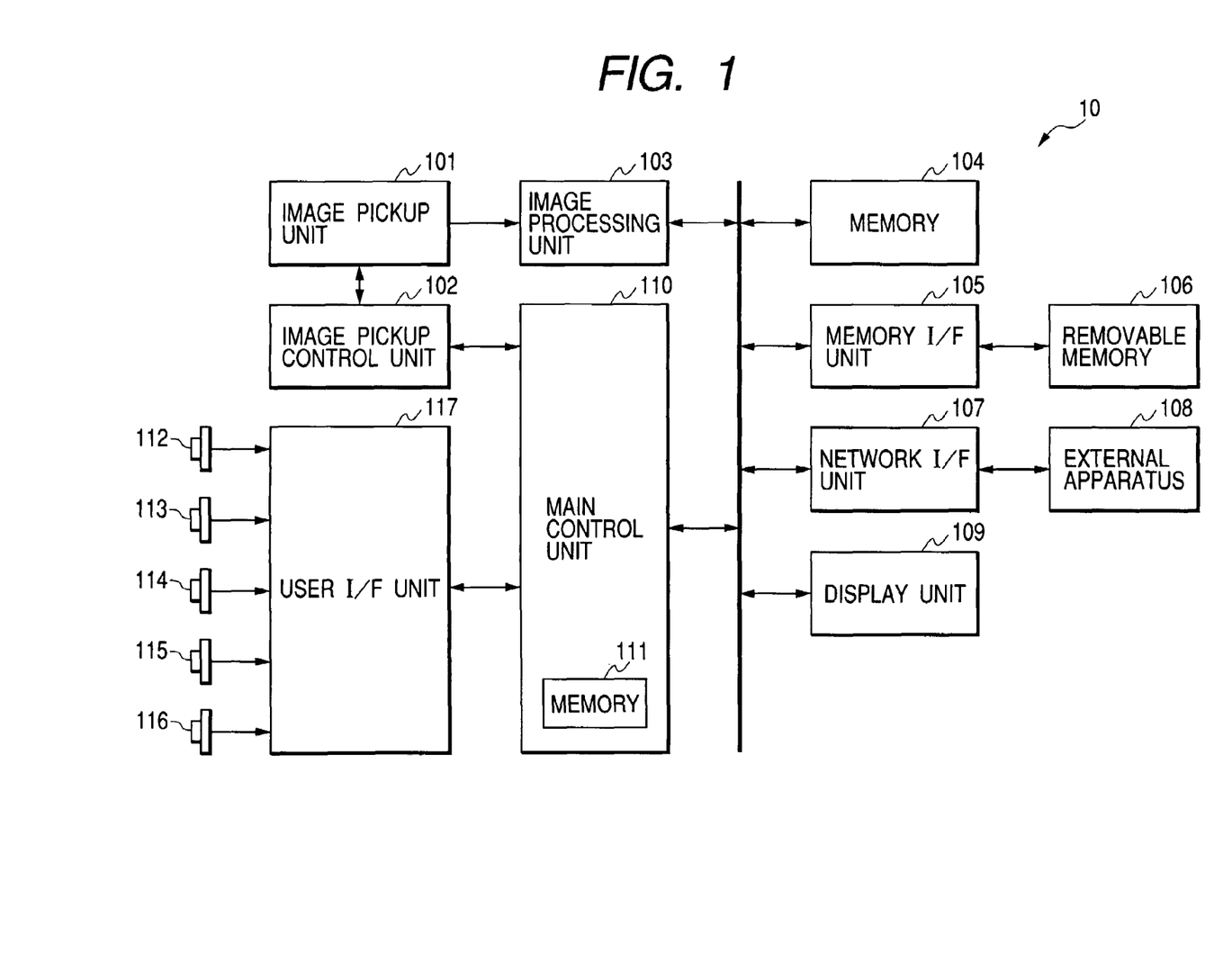
FIG. 1 shows the main configuration of an image pickup apparatus according to the first embodiment of the present invention.

FIG. 1 shows the main configuration of an image pickup apparatus 10 according to the first embodiment of the present invention. The image pickup apparatus 10 can be a digital camera, or a device having the function of picking up an object using an image sensor (for example, a personal digital assistant with a digital camera).

In FIG. 1, an image pickup unit 101 picks up an object using an image sensor and generates original image data which is image data of the object. An image pickup control unit 102 controls the operation of the image pickup unit 101 according to instructions from a main control unit 110. The image pickup control unit 102 provides the main control unit

110 with the information about the image data generated by the image pickup unit 101. An image processing unit 103 adjusts the image quality of the image data obtained from the image pickup unit 101 according to a plurality of predetermined image adjustment parameters, and compresses the adjusted image data in accordance with a predetermined image compressing method. Memory 104 stores various data.

A memory I/F unit 105 writes the image file specified by the main control unit 110 into removable memory 106, and reads out the image file specified by the main control unit 110 from the removable memory 106. The removable memory 106 can store a plurality of image files.

A network I/F unit 107 transmits the image file specified by the main control unit 110 to an external apparatus 108. The external apparatus 108 installs an application program for remotely controlling the image pickup apparatus 10, an application program for adjusting the image quality of image data according to a plurality of image adjustment parameters, etc.

A display unit 109 displays reduced image data of an image picked up by the image pickup unit 101, reduced image data of an image file read out from the removable memory 106, etc.

The main control unit 110 controls various functions of the image pickup apparatus 10. Memory 111 stores a block number of an image block selected in the previous enlargement display processing.

A user I/F unit 117 notifies the main control unit 110 of an instruction of a user. The user I/F unit 117 comprises, for example, a power supply switch 112, a shutter button 113, a display button 114, an enlargement display button 115, and a select button 116. The power supply switch 112 switches the power supply of the image pickup apparatus 10 on or off. The shutter button 113 indicates the start of image pickup. The display button 114 switches an image display mode between a single image display mode, a four-image display mode, a nine-image display mode, and an information display mode. The enlargement display button 115 switches the enlargement display mode on (valid) or off (invalid). In the image pickup apparatus according to the first embodiment of the present invention, switchover to the enlargement display mode from any of the single image display mode, the four-image display mode, the nine-image display mode, and the information display mode can be performed. The select button 116 switches the process mode of the enlargement display processing to a mode A or a mode B. The process mode of the enlargement display processing can be switched by the select button 116 or according to an instruction from the external apparatus 108.

Figure 2:
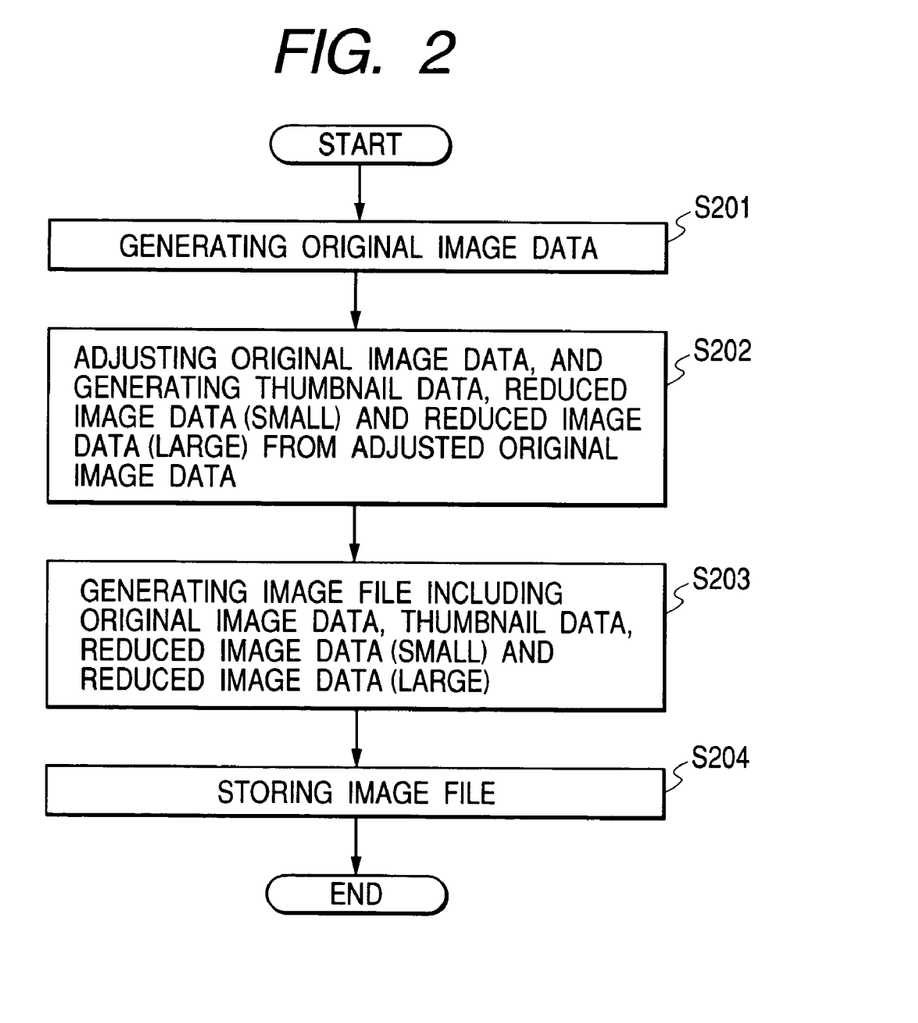
FIG. 2 is a flowchart showing the procedure of a picking up process.

FIG. 2 is a flowchart showing the procedure of a picking up process according to the first embodiment of the present invention.

Step S201: The image pickup unit 101 picks up an object using an image sensor, and generates the image data of the subject (hereinafter referred to as original image data).

Step S202: The image processing unit 103 adjusts the image quality, etc. of the original image data generated by the image pickup unit 101 according to a plurality of predetermined image adjustment parameters, and generates three types of reduced image data (thumbnail data, reduced image data (small), and reduced image data (large)) from the adjusted original image data. Furthermore, the image processing unit 103 compresses the three types of reduced image data (thumbnail data, reduced image data (small), and reduced image data (large)) in the same image compressing method (for example, the JPEG system in accordance with the ISO/IEC 10918-1) as the original image data.

Figure 3:
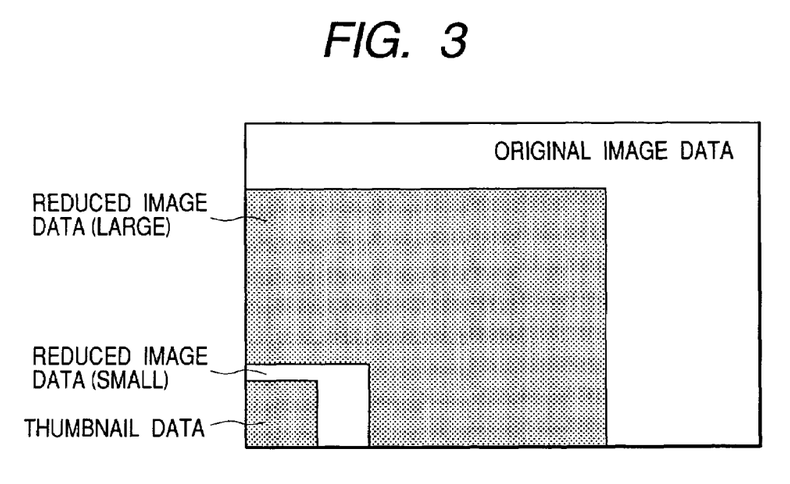
FIG. 3 is an explanatory view showing the relationship between original image data and three types of reduced image data (thumbnail data, reduced image data (small), and reduced image data (large))

FIG. 3 shows an example of the relationship between original image data and three types of reduced image data (thumbnail data, reduced image data (small), and reduced image data (large)). The thumbnail data is the smallest reduced image data, and is used in a device such as a personal computer, etc. The reduced image data (small) is reduced image data for normal display, and is larger than the thumbnail data. The image pickup apparatus 10 uses the reduced image data (small) when the image display mode is the single image display mode, the four-image display mode, the nine-image display mode, or the information display mode. The reduced image data (large) is reduced image data for enlargement display, and is the largest reduced image data. The image pickup apparatus 10 uses the reduced image data (large) when the image display mode is the enlargement display mode.

Figure 4:
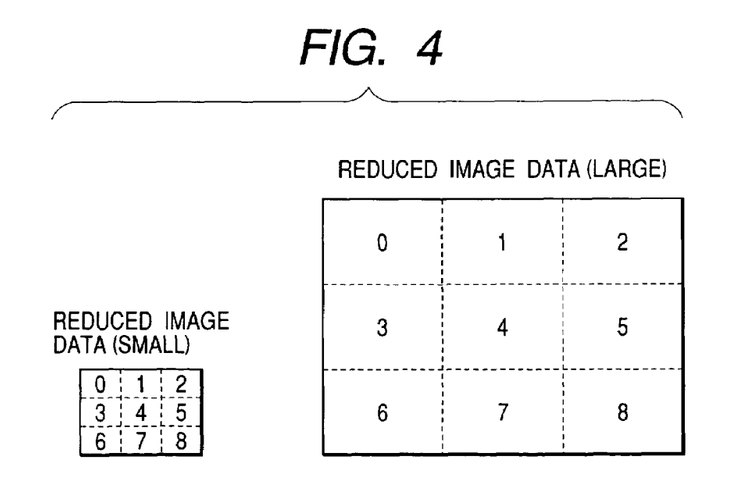
FIG. 4 is an explanatory view showing the relationship between reduced image data (small) and reduced image data (large)

FIG. 4 shows an example of the relationship between reduced image data (small) and reduced image data (large). The reduced image data (small) and the reduced image data (large) are formed by a plurality of image blocks as shown in FIG. 4. The image block n (n=0 to 8) of the reduced image data (large) corresponds to the image block n of the reduced image data (small). That is, the image block n of the reduced image data (large) is an enlarged image of the image block n of the reduced image data (small). Therefore, when an enlarged image of the image block n of the reduced image data (small) is displayed, the image pickup apparatus 10 displays the image block n of the reduced image data (large). The size of the image block of the reduced image data (large) is assumed to be equal to the size of the reduced image data (small).

Figure 5:
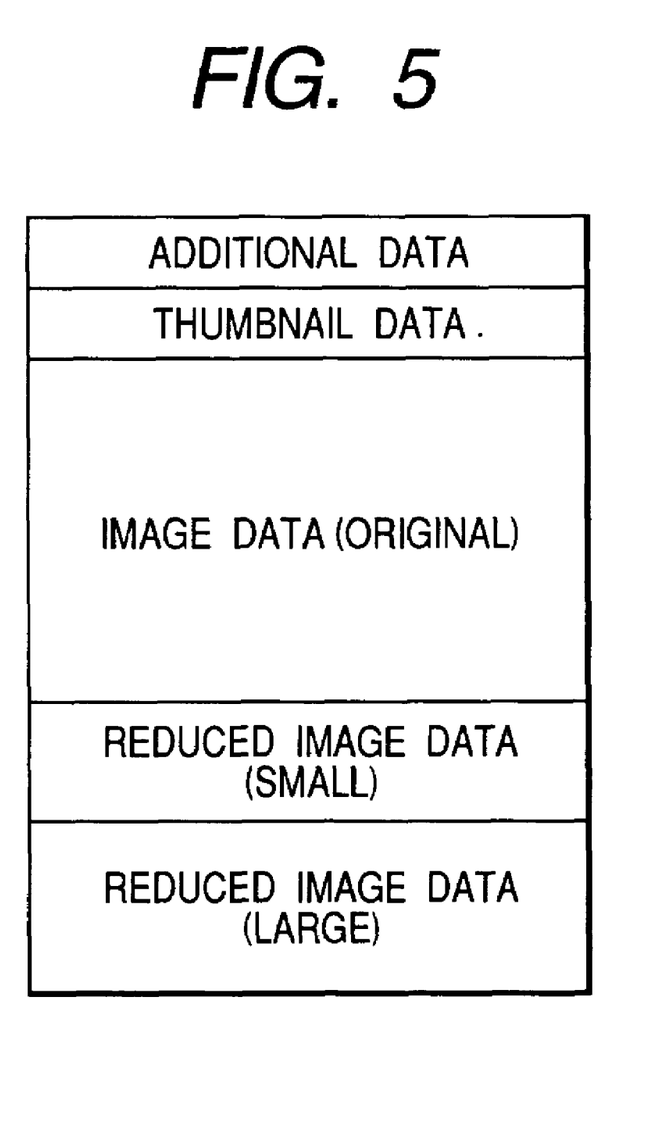
FIG. 5 shows the general configuration of an image file.

Step S203: The main control unit 110 generates an image file including the original image data, thumbnail data, reduced image data (small), reduced image data (large), and additional data (including various information about the original image data) generated by the image processing unit 103, and stores the generated image file in the memory 104. FIG. 5 shows the general configuration of the image file.

Step S204: The memory I/F unit 105 reads out an image file from the memory 104, and stores the read image file in the removable memory 106.

Thus, the image pickup apparatus 10 according to the first embodiment of the present invention can generate reduced image data for enlargement display from the original image data obtained when an object is picked up. Therefore, the process of enlarging and displaying part of reduced image data for normal display can be performed at a high speed.

Furthermore, the image pickup apparatus 10 according to the first embodiment can generate reduced image data for enlargement display not from thumbnail data or reduced image data for normal display but from the original image data. Therefore, high-resolution reduced image data for enlargement display can be displayed.

Figure 9:
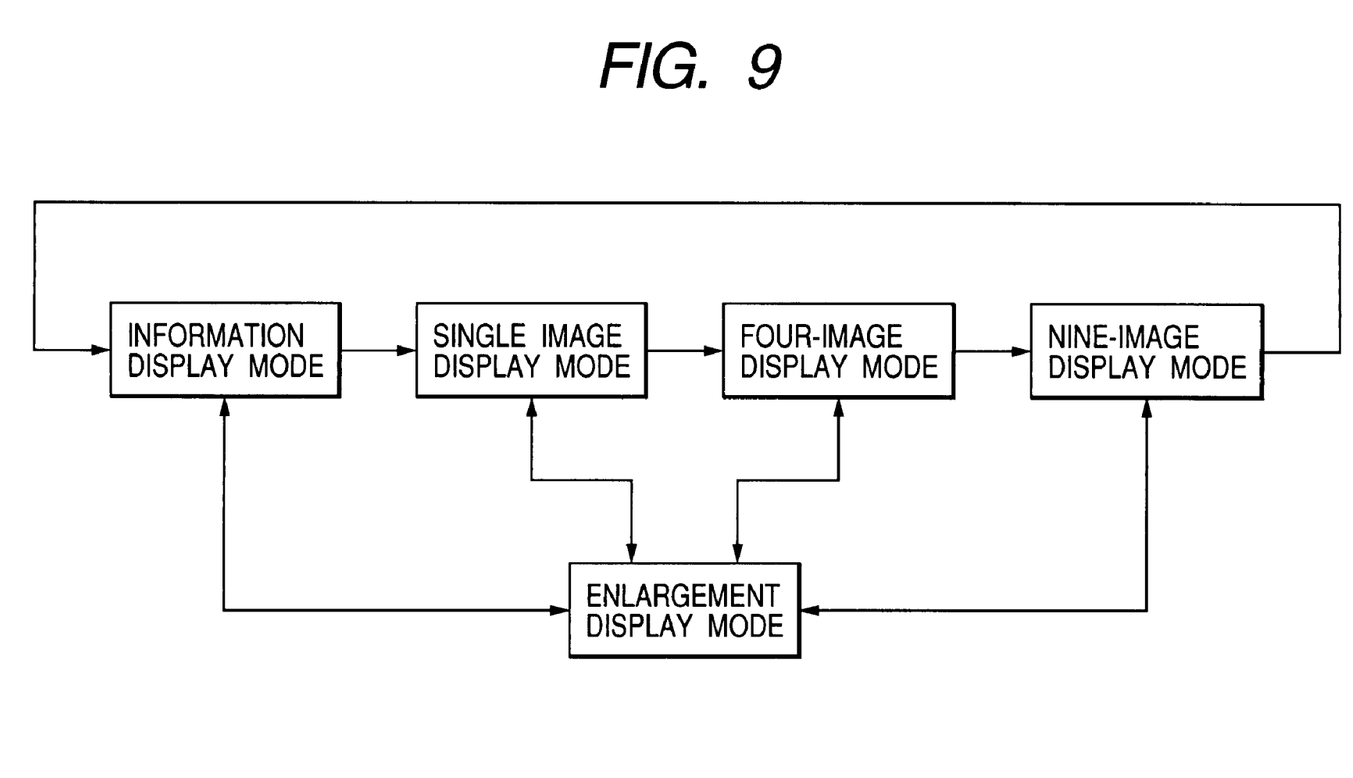
FIG. 9 shows the relationship among the image display modes according to the first embodiment.

FIG. 9 shows a plurality of image display modes of the image pickup apparatus 10 according to the first embodiment of the present invention.

As shown in FIG. 9, the image pickup apparatus 10 according to the first embodiment has a single image display mode, a four-image display mode, a nine-image display mode, and an information display mode. In the single image display mode, reduced image data (small) obtained from an image file is displayed on the display unit 109. In the four-image display mode, reduced image data (small) obtained from four image files is arranged in a matrix array and displayed on the display unit 109. In the nine-image display mode, reduced image data (small) obtained from nine image files is arranged in a matrix array and displayed on the display unit 109. In the information display mode, the reduced image data (small) obtained from one image file and various information about the original image data obtained from the image data are displayed on the display unit 109.

The image pickup apparatus 10 according to the first embodiment of the present invention further has an enlargement display mode. In the enlargement display mode, an enlarged image of reduced image data (small) selected by a user is displayed on the display unit 109 in accordance with the enlargement display processing described later. The switchover to enlargement display mode from any of the single image display mode, the four-image display mode, the nine-image display mode, and the information display mode can be performed only by pressing the enlargement display button 115.

Thus, the image pickup apparatus 10 according to the first embodiment can perform the switchover to the enlargement display mode only by pressing the enlargement display button 115 from any of the plurality of image display modes (single image display mode, four-image display mode, nine-image display mode, and information display mode), thereby providing a user with a simple and easily operable user interface.

Figure 6:
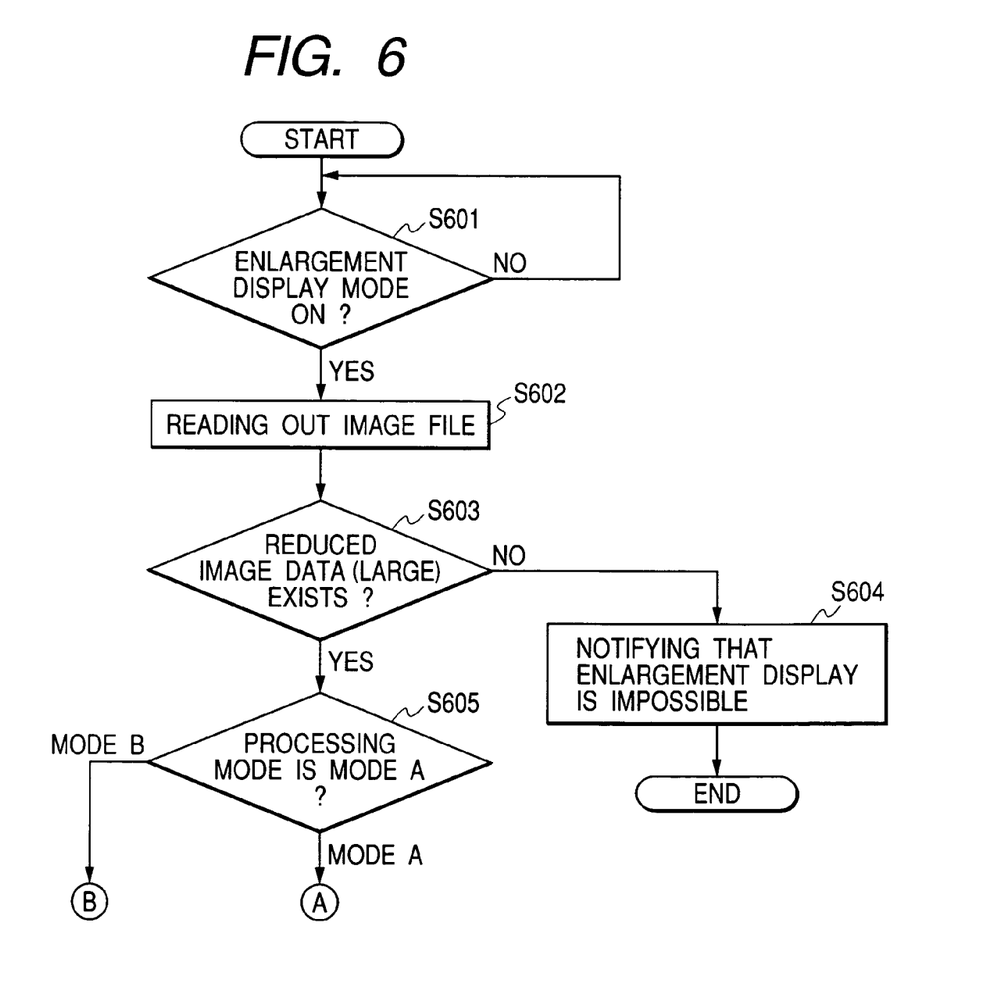
FIG. 6 is a flowchart showing the procedure of enlargement display processing.
Figure 7:
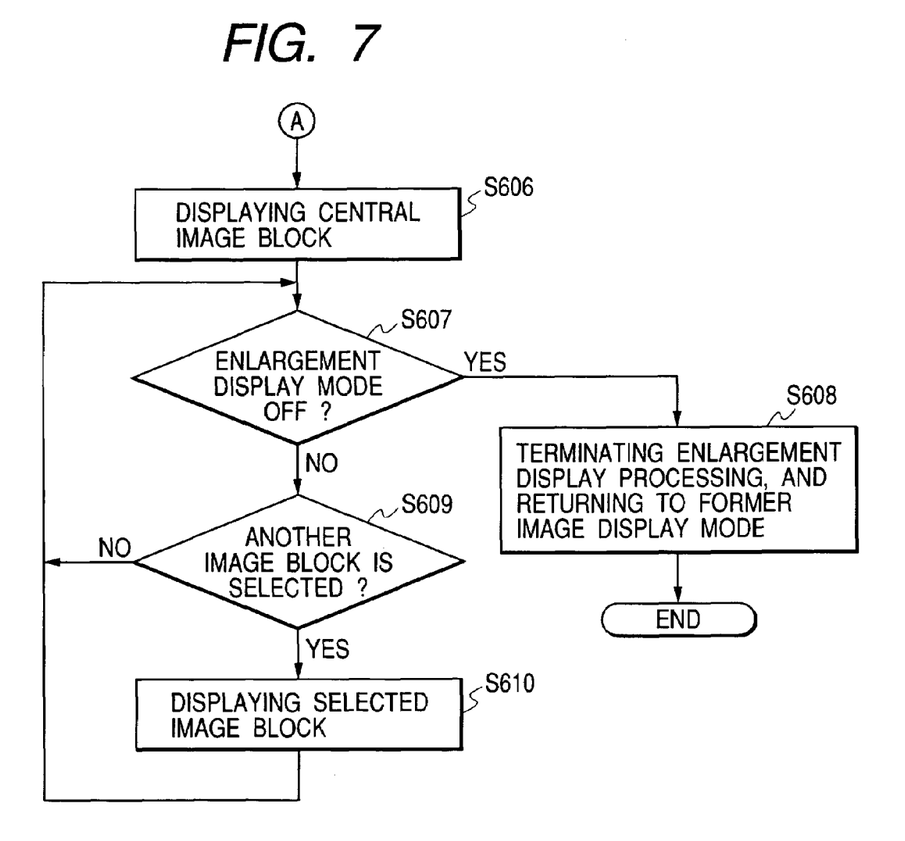
FIG. 7 is a flowchart showing the procedure of enlargement display processing.
Figure 8:
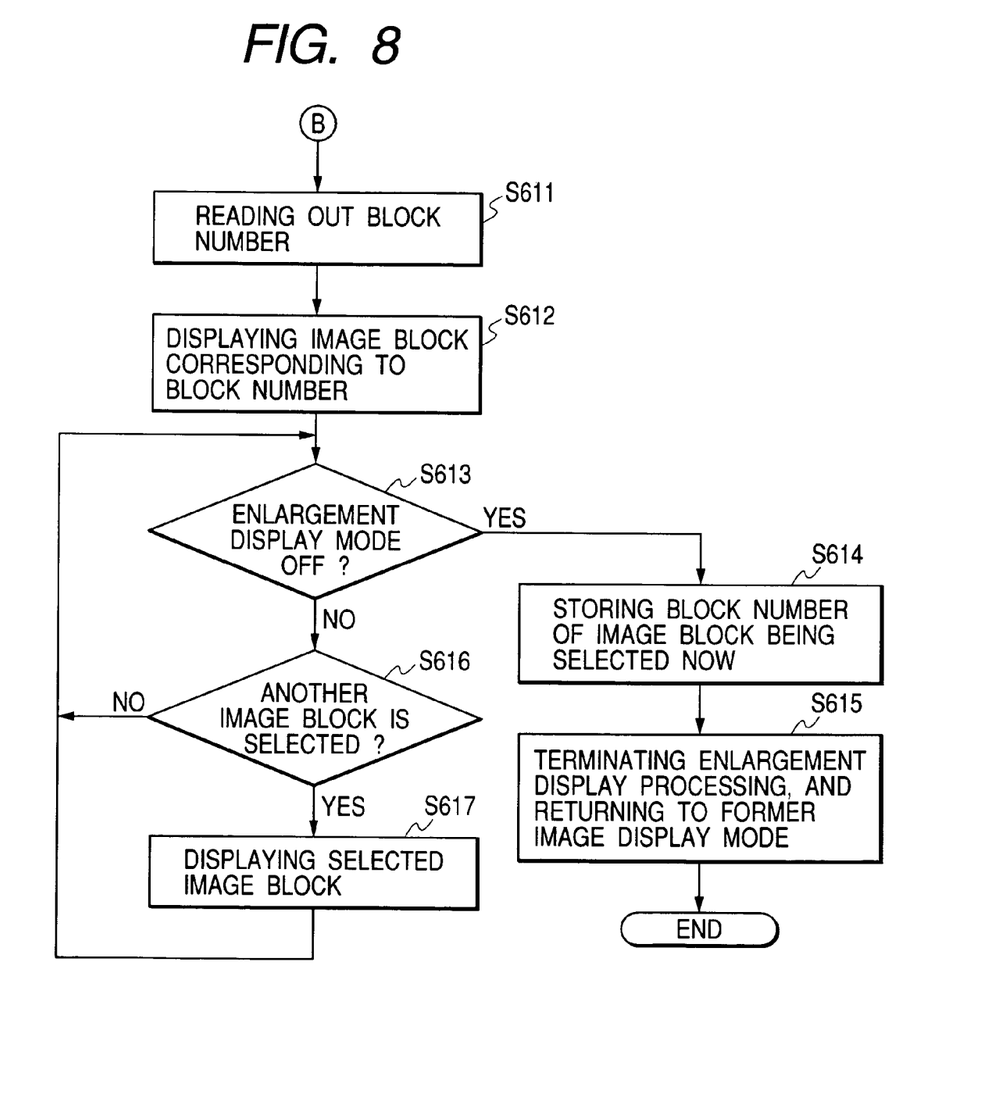
FIG. 8 is a flowchart showing the process procedure of enlargement display processing.

FIGS. 6 to 8 are flowcharts showing the process procedure of the enlargement display processing of enlarging and displaying part of reduced image data (small).

Step S601: The main control unit 110 determines whether or not the user turns on the enlargement display mode. At this time, the image display mode of the image pickup apparatus 10 may be any of the single image display mode, the four-image display mode, the nine-image display mode, and the information display mode. When the user turns on the enlargement display mode, control is advanced to step S602. In this case, the enlargement display mode is turned on.

Step S602: The memory I/F unit 105 reads out from the removable memory 106 an image file corresponding to the reduced image data (small) being selected, and the read image file is stored in the memory 104.

Step S603: The main control unit 110 analyzes an image file stored in the memory 104, and determines whether or not reduced image data (large) is added to the image file. If it is not added, control is advanced to step S604. If it is added, control is advanced to step S605.

Step S604: The main control unit 110 displays on the display unit 109 a message or a mark of notifying a user that the enlargement display processing cannot be performed. Then, the main control unit 110 returns to the original image display mode (screen in the single image display mode, the four-image display mode, or the information display mode).

Step S605: The main control unit 110 determines the process mode of the enlargement display processing. If the process mode is the mode A, then control is advanced to step S606. If the process mode is the mode B, then control is advanced to step S611. In the mode A, the enlargement display processing starts from the central image block (image block 4). In the mode B, the enlargement display processing starts from the image block corresponding to the block number stored in the previous enlargement display processing.

Step S606: The main control unit 110 retrieves the central image block from the reduced image data (large), and the retrieved image block is displayed on the display unit 109.

Step S607: The main control unit 110 determines whether or not the user turns off the enlargement display mode. If the user turns off the enlargement display mode, then control is advanced to step S608.

Step S608: The main control unit 110 terminates the enlargement display processing, and returns to the original image display mode (screen in the single image display mode, the four-image display mode, or the information display mode).

Step S609: The main control unit 110 determines whether or not another image block is selected. If another image block is selected, control is advanced to step S610. An image block can be selected using the network I/F unit 107.

Step S610: The main control unit 110 retrieves a selected image block from the reduced image data (large), and displays the retrieved image block on the display unit 109.

Step S611: The main control unit 110 reads out the block number stored in the memory 111.

Step S612: The main control unit 110 clips an image block corresponding to the block number read in step S611 from the reduced image data (large), and displays the clipped image block on the display unit 109.

Step S613: The main control unit 110 determines whether or not the user turns off the enlargement display mode. If the user turns off the enlargement display mode, then control is advanced to step S614.

Step S614: The main control unit 110 writes the block number of the image block being selected into the memory 111.

Step S615: The main control unit 110 terminates the enlargement display processing, and returns to the original image display mode (screen in the single image display mode, the four-image display mode, or the information display mode).

Step S616: The main control unit 110 determines whether or not another image block is selected. If another image block is selected, control is advanced to step S617. An image block can be selected using the network I/F unit 107.

Step S617: The main control unit 110 retrieves a selected image block from the reduced image data (large), and displays the retrieved image block on the display unit 109.

Thus, the image pickup apparatus 10 according to the first embodiment of the present invention can perform the enlargement display processing using the reduced image data for enlargement display obtained when an object is picked up, thereby performing the enlargement display processing at a high speed.

Furthermore, the image pickup apparatus according to the first embodiment can generate reduced image data for enlargement display not from thumbnail data or reduced image data for normal display but from the original image data. Therefore, high-resolution reduced image data for enlargement display can be displayed.

Additionally, the image pickup apparatus 10 according to the first embodiment can start the enlargement display processing from the portion stored in the previous enlargement display processing.

Second Embodiment

To operate various devices so that the functions according to the above-mentioned embodiment can be realized, the computer in the device or the system connected to the above-mentioned various devices can be provided with a program code of the software for realization of the function of the above-mentioned embodiment, and the above-mentioned various devices can be operated according to the program stored in the computer (CPU or MPU) of the system or the device. This can also be included in the scope of the present invention.

In this case, the program code of the above-mentioned software realizes the function of the above-mentioned embodiment, and the program code configures the present invention. The means for providing the program code for the computer, for example, a storage medium storing the program code can also configure the present invention. The storage medium storing the program code can be, for example, a flexible disk, a hard disk, an optical disk, a magneto-optic disk, CD-ROM, a magnetic tape, a nonvolatile memory card, ROM, etc.

It is obvious that a program code provided for a computer and executed to realize the above-mentioned functions of the embodiment, and realize the functions of the above-mentioned embodiment in cooperation with the OS (operating system) operated in the computer, or with another application software, etc. is also included in the embodiments of the present invention.

Furthermore, after the provided program code is stored in the memory of the extension board of a computer or an extension unit connected to a computer, the CPU, etc. provided in the extension board and the extension unit performs part or all of the actual processes at an instruction of the program code to realize the functions of the above-mentioned embodiment. In this case, the program code is apparently included in the present invention.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image pickup apparatus comprising:
   a user interface including a photographing instruction unit which issues a photographing instruction of image data and a mode instruction unit which changes a mode of the apparatus between a plurality of different modes including a photographing mode for photographing image data and a display mode for displaying an image of the image data written on a recording medium;
   an image pickup unit which obtains, in the photographing mode, original image data in accordance with the photographing instruction;
   an image processing unit which generates, in the photographing mode, first reduced image data, second reduced image data for an enlargement display process of enlarging and displaying a part of the first reduced image data and thumbnail data from the original image data obtained by said image pickup unit, wherein the second reduced image data is larger than the first reduced image data and the first image data is larger than the thumbnail data;
   an image file generation unit which generates, in the photographing mode, an image file by storing the original image data, the first reduced image data corresponding to the original image data, the second reduced image data corresponding to the original image data and the thumbnail data of the original image data into one image file;
   an interface unit which writes the image file generated by said image file generation means on the recording medium and reads out the image file from the recording medium, wherein the interface unit writes the image file on the recording medium in the photographing mode, and reads the image file from the recording medium in the display mode;
   a display unit which displays, in the display mode, the first reduced image data and the second reduced image data stored in the image file read out from the recording medium by said interface unit; and
   a control unit which controls said display unit, in the display mode in response to an instruction of enlarging part of the first reduced image data displayed by said display unit, so as to select a part of the second reduced image data and to display the selected part of the second reduced image data stored in the image file which stores the first reduced image data and is read out from the recording medium by said interface unit instead of the first reduced image data.

2. The image pickup apparatus according to claim 1, wherein said image processing unit compresses the original image data and the first reduced image data in accordance with the same image compressing method.

3. The image pickup apparatus according to claim 1, wherein said image processing unit compresses the first reduced image data and the second reduced image data in accordance with the same image compression method.

4. The image pickup apparatus according to claim 1, wherein the plurality of different modes include a plurality of different modes each for displaying a different number of images,
   wherein said control unit is capable of starting the enlargement display process even if any of the plurality of display modes is selected.

5. An image pickup apparatus comprising:
   an image pickup unit which obtains original image data;
   an image processing unit which generates first reduced image data, second reduced image data for an enlargement display process of enlarging and displaying a part of the first reduced image data and thumbnail data from the original image data obtained by said image pickup unit, wherein the second reduced image data is larger than the first reduced image data and the first image data is larger than the thumbnail data;
   an image file generation unit which generates an image file by storing the original image data, the first reduced image data corresponding to the original image data, the second reduced image data corresponding to the original image data and the thumbnail data of the original image data into one image file;
   an interface unit which writes the image file generated by said image file generation means on a recording medium and reads out the image file from the recording medium;
   a display unit;
   a user interface including a photographing instruction unit which issues a photographing instruction of the image data and a mode instruction unit which changes a mode of the apparatus to one of a photographing mode in which the image pickup unit obtains the original image data in accordance with the photographing instruction issued by the photographing instruction unit, the image processing unit generates the first reduced image data, the second reduced image data and the thumbnail data, the image file generation unit generates the image file and the interface unit writes the image file on the recording medium, and a display mode in which the interface unit reads the image file from the recording medium and the display unit displays the first reduced image data and the second reduced image data stored in the image file read out from the recording medium by said interface unit.

* * * * *